2,877,218
DYES FROM STILBENE DICARBOXYLIC ACID AMIDES

Robert S. Long, Bound Brook, and Sien Moo Tsang, Middlesex Borough, N. J., assignors to American Cyanamid Company, New York, N. Y., a corporation of Maine No Drawing. Application December 30, 1953
Serial No. 401,376

11 Claims. (Cl. 260—168)

This invention relates to new dyes and, more specifically, it relates to new dyes of the structure:

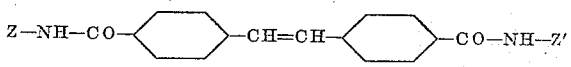

in which Z and Z' are organic radicals. More specifically, Z and Z' may be (1) a vattable organic radical such as anthraquinone, or (2) a carbocyclic aryl radical of not more than two rings. Among the most useful compounds of my invention are the azo dyestuffs in which Z is further substituted by an azo radical. Because of their many desirable properties these azo compounds will be described first.

THE AZO DYES

We have found that when azo dyes which contain a free amino group are condensed with the acid chloride of stilbene dicarboxylic acid, there are formed new azo dyes which have excellent substantivity for cellulosic fibers. It is a further advantage that these new dyes in general have excellent fastness to light and washing, often superior to available commercial types. These new azo dyes may be represented by the formula:

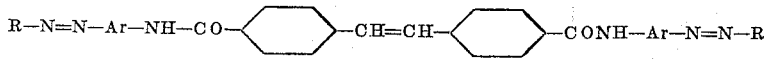

in which R and Ar are aromatic residues of not more than two rings.

The amino azo dyes which are to be reacted with stilbene dicarboxylic acid are prepared in several ways. A diazotized amine can be coupled into an amino compound to form the aminoazo compound:

$$RN_2X + ArNH_2 \rightarrow R-N=N-Ar-NH_2 \quad (1)$$

Conversely, a nitroamine can be diazotized and coupled, followed by reduction of the nitro compound:

$$NO_2ArN_2X + RH \rightarrow R-N=N-Ar-NO_2 \rightarrow \quad (2)$$
$$R-N=N-Ar-NH_2$$

or an acylamino group may be used in place of nitro, the acyl group being removed by hydrolysis after the coupling. The choice of route will depend on the structures of the R and Ar components. The aminoazo compound thus prepared is reacted with stilbene dicarbonyl chloride to form the dyes of this invention.

Both of the carbocyclic aromatic residues which form the aminoazo compound can be either naphthalene or benzene derivatives. They can be further substituted by alkyl, alkoxy, hydroxy, halogen, amino, carboxy, or sulfonic groups. In carrying out the synthesis of the dyes of the present invention, an exceedingly wide range of compounds may be used, resulting in the production of numerous attractive shades in the finished product. For example, synthesis by Route 2 can utilize such nitroamines as 5-nitro-2-aminotoluene, 4-nitroaniline-2-sulfonic acid, 5-nitro-2-aminoanisole, 2-nitro-4-methyl-5-amino anisole, 3-nitro-4-chloro-aniline, 4-nitro-2-aminotoluene, 4-nitro-2-aminoanisole, 6-nitro-4-amino-1,3-dimethylbenzene, 3-nitro-1-naphthylamine, 4-nitro-1-naphthylamine, 5-nitro-1-naphthylamine, 1-chlor-2-amino-4-nitronaphthalene. These can be coupled into the various naphtholsulfonic acids known to the art, into naphthols such as beta-naphthol, and into phenols, such as salicylic acid, phenol, cresols, resorcinol, and the like. They may also be coupled into naphthylamines such as 2-naphthylamine-5,7-disulfonic acid, gamma acid, or J acid in such a way that coupling is ortho to the amino group. By using Route 1 one can couple various diazo compounds such as those from aniline, toluidines, anisidines, aminosalicylic acids, and aminonaphthalene compounds such as H acid, amino G acid, K acid, Cassella's acid, gamma acid, and the like with aniline and naphthylamine derivatives.

It is a further advantage of our invention, that when the starting materials are chosen so that metallizable groups (e. g., hydroxy, alkoxy, halogen, carboxy) are present ortho to the azo linkage in the aminoazo intermediate, it is possible, after condensation with stilbene dicarbonylchloride, to metallize the final dyestuffs to obtain very valuable dyes with excellent fastness properties.

THE COUPLING COMPONENTS

Azo dyes of this general type may also be prepared by a third route. If the stilbene dicarboxylic acid is condensed with an aminophenol, an amino naphthol, or a diamino benzene or naphthalene, the resultant amide can be used as a coupling component for diazotized amines and the products are also azo dyes of the type contemplated.

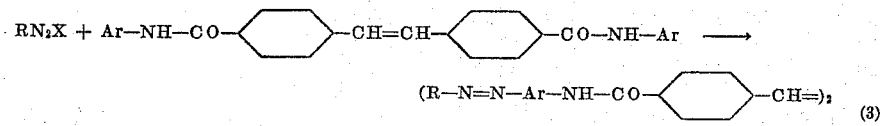

These coupling components are also new compounds. They are derived from such aminophenols, aminonaphthols, and diamino compounds as m-aminophenol, m-phenylene diamine, m-toluylene diamine, 5-amino-2-naphthol, 8-amino-2-naphthol, J acid, gamma acid, H acid, Chicago acid aminoacetoacetanilides, and aminophenylpyrazolones. These compounds all have in common not only the amino group to be acylated, but also a group which activates coupling of diazonium compounds such as amino or hydroxyl. This route to the azo dyes of our invention has an advantage over the other routes in that a number of different dyes can be readily prepared from one starting material. The products prepared by this route show excellent fastness to chlorine.

THE VATTABLE COMPOUNDS

Acylamino derivatives of anthraquinones have been used as dyes in the past. Like most simple anthraquinone compounds they have a low substantivity to fibers. We have found that stilbene dicarboxylic acid forms amides with aminoanthraquinones that are not only substantive but have good fastness properties. The anthraquinones which can be used include 1-aminoanthraquinone, 2- aminoanthraquinone and their alkl and halogen derivatives; 1,4 - diaminoanthraquinone, 1,5 - diaminoanthraquinone, 1,8-diaminoanthraquinone, 2,6-diaminoanthraquinone and their alkyl and halogen derivatives; 4-aminoanthraquinone-1(N), 2-benzacridone and its halogen and alkyl derivatives; 4-amino-1, 1'-dianthrimide-2,2'-carbazole, 5-amino-1,1'-dianthrimide-2,2' - carbazole, amino dibenzanthrone, 4-amino-1,9-anthrapyrimidone, 4-amino-1,9-pyrazolanthrone, 4-amino-1,9-isothiazolanthrone and the like.

The stilbene dicarboxylic acid amides can be prepared by a variety of conventional methods. Thus, the stilbene dicarboxylic acid may be converted to the di-acid chloride by the use of phosphorus trichloride, phosphorus pentachloride, phosphorus oxychloride, thionyl chloride, or a similar agent. The acid chloride may then be reacted with two moles or the amine or aminoazo compound, in the presence of an inert solvent if necessary. A convenient method is to heat the dicarboxylic acid in an excess of thionyl chloride under reflux, to distill off the excess reagent, and to treat the acid chloride with the amine in pyridine at the boil. Still better, the dicarboxylic acid is reacted with only the theoretical amount of thionyl chloride by gentle warming in pyridine, and the amine is then added directly to the reaction mixture, which is then heated at the boiling point. An alternative method whereby one may isolate the acid chloride in pure form is to heat the dicarboxylic acid with the theoretical amount of thionyl chloride in an indifferent medium such as nitrobenzene; the acid chloride precipitates out and may be filtered off; it is then reacted with the amine as before.

OPTICAL BLEACHING AGENTS

We have further found that, when the Z and Z' in the general formula for our invention,

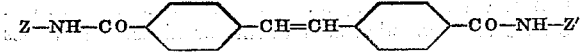

are carbocyclic aryl radicals of not more than two rings substituted by sulfonic acid radicals, the products show fluorescence under ultraviolet light and can be used as optical bleaching agents. In the preparation of these optical bleaching agents the stilbene dicarboxylic acid is used to acylate amino aryl sulfonic acids. The latter may be further substituted by alkyl, alkoxy, triazinylamino, and similar groups. Among the amino aryl sulfonic acids which may be used are sulfanilic acid, metanilic acid, 3-amino-4-methoxy benzene-sulfonic acid, 4-amino-3-methoxy benzene sulfonic acid, 3-amino-4-(2,4-dianilino-1,3,5-triazinyl-6-amino)benzene sulfonic acid, naphthionic acid, 5-amino-naphthalene-1-sulfonic acid, 5-aminonaphthalene-2-sulfonic acid, 3-amino-naphthalene-1,5-disulfonic acid, and the like.

It is an advantage of these new optical bleaching agents that a variety of fluorescent compounds are easily obtained from readily available intermediates. Many of the above aminoaryl sulfonic acids are used in preparing other dyes and are thus available intermediates. With the stilbene dicarboxylic acid on hand, a wide variety of fluorescent optical bleaching agents can be obtained by the use of different aminoaryl sulfonic acids.

By using equimolar quantities of one aminoaryl sulfonic acid, followed by a similar quantity of another, it is easily possible to prepare optical bleaching agents which are unsymmetrical, i. e., in which Z and Z' are different. This is a further advantage of our invention, in that it provides an unusually flexible type of optical bleaching agent structure, in which variations in the properties are easily made by changing the identity and quantity of the aminoaryl sulfonic acid groups.

Our invention can be illustrated by the following examples, in which parts are by weight unless otherwise specified. Examples 1 through 6 and 8 illustrate the azo dyes. Examples 7 and 9 illustrate the preparation of coupling components; and the vattable compounds are illustrated by Examples 10, 11 and 12. Examples 13 through 15 illustrate valuable optical bleaching agents.

Example 1

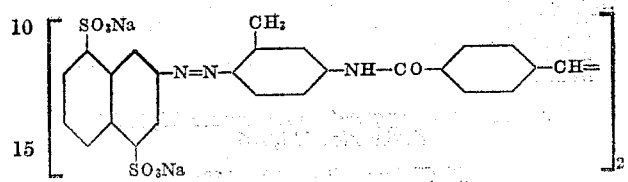

The monoazo dye used for the preparation of this stilbene dicarboxylic acid dye is obtained by coupling Cassella's acid diazo with m-toluidine in a slightly acidic mixture. It is purified by salting the solution with sodium acetate, filtering, washing with ethanol, and drying in vacuo.

The stilbene dicarbonyl chloride is prepared by heating a mixture of 1.34 parts of stilbene-4,4'-dicarboxylic acid, 1.61 parts of thionyl chloride and 49.2 parts of dried pyridine at 55° C. for two hours. To the mixture 5.58 parts of the monoazo dye is added. The resulting mixture is refluxed until the reaction is substantially complete. It is then drowned in water and the pyridine is substantially removed by steam stripping. The dye is isolated by salting, filtering, and drying. It dyes cotton in a greenish yellow shade with excellent light and wash fastness.

Example 2

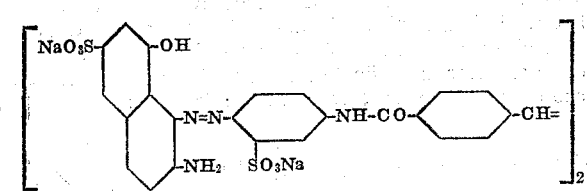

The stilbene dicarbonyl chloride is prepared from 2.68 parts of stilbene-4,4'-dicarboxylic acid according to the method described under Example 1. The resulting mixture is then refluxed with 13 parts of the monoazo dye, prepared by coupling diazotized p-nitroaniline sulfonic acid with gamma acid in strongly acid medium and reducing the $NO_2$ group by means of sodium sulfide. The reaction mixture is drowned in 300 parts of water containing 8.1 parts of sodium carbonate and 50 parts of sodium chloride. After the removal of the pyridine by steam distillation, the dye is separated by filtration. It is purified by reprecipitation from the aqueous solution. It dyes cotton a pink shade, much yellower than the urea analog. It shows excellent wash fastness.

Example 3

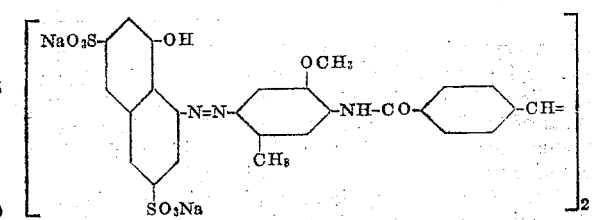

The dye is prepared by the reaction of 6.64 parts of the monoazo dye obtained by coupling diazotized o-benzene-sulfonyl H acid to cresidine with the stilbene dicarbonyl chloride (prepared from 1.07 parts of the acid) in the manner described in the preceding examples. The benzenesulfonyl residues are removed from the product thus obtained by heating with a solution of 4.0 parts of sodium hydroxide in about 250 parts of water at 75° C. The resulting mixture is treated with 25 parts of salt and acidified with acetic acid. The dye is filtered and dried. It 10-15° C. in 80 parts of water containing 3.3 parts of sodium carbonate as the neutralizing agent. The dye is separated by salting with 10 parts of sodium chloride and isolated by filtration. It dyes cotton a scarlet shade which turns bluer on after-treatment with copper or chromium salt.

*Example 6*

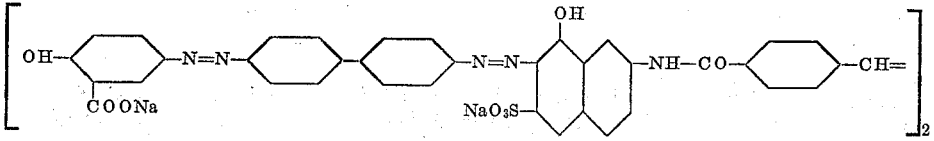

dyes cotton a reddish brown shade with good light fastness.

*Example 4*

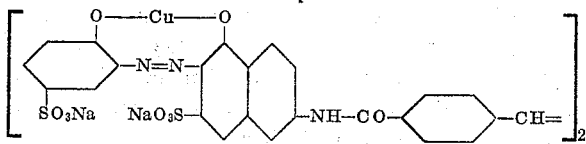

Stilbene-4,4'-dicarboxylic acid chloride is prepared by refluxing a mixture of 1.34 parts of stilbene-4,4'-dicarboxylic acid with 16.4 parts of thionyl chloride. After being stripped of excess thionyl chloride, the acid chloride is heated with a mixture of 3.92 parts of J acid as the sodium salt and 24.6 parts of dried pyridine at reflux for one hour. After being cooled to room temperature, the mixture is filtered. The diamide thus obtained is purified twice by recrystallization from the aqueous solution.

The diamide, 1.43 parts, is dissolved in a solution of 1.2 parts of sodium carbonate in 10 parts of water. The resulting solution is cooled to 10° C. and treated with a slight excess of the diazo from 3-amino-4-methoxybenzene sulfonic acid which is obtained by the usual method of diazotization. The bis-azo dye is separated by filtration. It dyes cotton a reddish orange shade.

The dye is metallized by heating with a mixture of 2.82 parts of copper sulfate, 10.2 parts of 15 N ammonium hydroxide solution and 40 parts of water at 85-90° C. for twenty-four hours. The metallized dye is separated by filtration. It dyes cotton in a bluish red shade with excellent light fastness.

*Example 5*

A mixture of 10.72 parts of stilbene-4,4'-dicarboxylic acid, 13.83 parts of thionyl chloride and 393 parts of dried pyridine is heated at 55° C. until the reaction is complete. Twenty-five parts of gamma acid is then added. The resulting mixture is heated at reflux until the reaction is substantially complete. It is drowned into 500 parts of water containing 100 parts of sodium chloride and 12 parts of sodium carbonate. After the removal of the pyridine by steam distillation, the mixture is clarified by filtration. When the mixture is cooled, the diamide separates. It is filtered, washed with 10% sodium chloride solution and dried.

The dye is obtained by coupling 2.76 parts of the diamide with a slight excess anthranilic acid diazo at Benzidine tetrazo is prepared from 2.57 parts of benzidine dihydrochloride by the usual method of tetrazotization. It is coupled with 1.48 parts of salicylic acid in about 80 parts of water with sodium carbonate as the neutralizing agent. To the resulting mixture a solution of 3.77 parts of the diamide from gamma acid (prepared as described in Example 5) in 150 parts of water and 19.6 parts of pyridine is added, with 1.06 parts of sodium carbonate present as the neutralizing agent. The reaction is effected at 10° C. The dye is separated by salting and filtering. It dyes cotton a reddish brown shade with good wash and light fastness.

*Example 7*

A mixture of 1 part of 4,4'-stilbene dicarboxylic acid, 20 parts of dry pyridine, and 0.89 part of thionyl chloride was heated with stirring at 50-55° C. until formation of the acid chloride was complete. The mixture was then refluxed with 1.31 parts of 1-amino-7-naphthol until the condensation was complete. A grey solid was precipitated by pouring the dark brown solution into 200 parts of water, and it was filtered off. The solid was taken up in 80 parts of ethanol and 7.6 parts of 5 N potassium hydroxide, and the solution was heated on the steam bath while gradually adding 100 parts of water. A small amount of sediment was filtered off and a curdy grey solid was obtained by acidifying the filtrate. It was isolated by filtration and purified by recrystallization from a pyridine-water mixture. A good yield was obtained of a tan solid, melting above 325° C., which gave a good analysis for the desired stilbene - 4,4'- dicarboxy(7-hydroxynaphthylamide.)

*Example 8*

The product of Example 7 was coupled on cotton cloth with a number of stabilized diazonium compounds of the type known as "fast bases." The following colors were obtained:

| Fast base from: | Color |
| --- | --- |
| 1-aminoanthraquinone | Pink |
| 5-nitro-p-anisidine | Bordeaux |
| 5-nitro-o-anisidine | Blue Red |
| Dianisidine | Blue |

*Example 9*

The procedure of Example 7 is used substituting 0.9 part of m-aminophenol for the 1-amino-7-naphthol. A good yield of stilbene-4,4'-dicarboxy-m-hydroxyanilide is obtained. This may be used to couple with "fast bases" in a manner similar to that used in Example 8.

Example 10

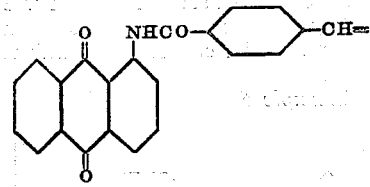

2.7 parts of 4,4'-stilbene dicarbonyl chloride and 4.0 parts of 1-aminoanthraquinone are introduced into 72 parts of nitrobenzene and the mass is stirred while being gradually heated to 140° C. It is then held at 140–150° C. until the reaction is substantially complete after which the slurry is cooled. The product is isolated by filtration and washing with nitrobenzene and alcohol. The dye is obtained as an orange-yellow powder which dyes cotton bright golden yellow shades from a dull violet vat. It dissolves in concentrated $H_2SO_4$ with an orange-brown color.

Example 11

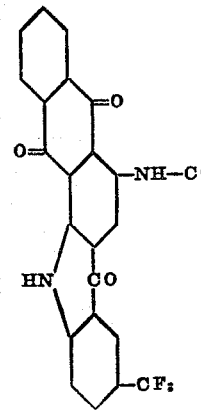 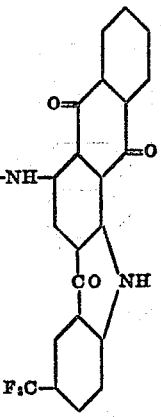

The procedure of Example 11 is followed, using an equivalent quantity of 5'-trifluoromethyl-4-aminoanthraquinone-1(N)-2-benzacridone in place of the 1-aminoanthraquinone. The product is a blue powder which dyes cotton a blue shade of good properties.

Example 12

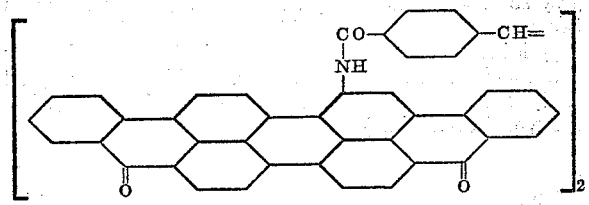

The procedure of Example 11 is followed, using an equivalent amount of aminodibenzanthrone in place of the aminoanthraquinone. The product so obtained is a green blue solid which dyes cotton fast green blue shades.

Example 13

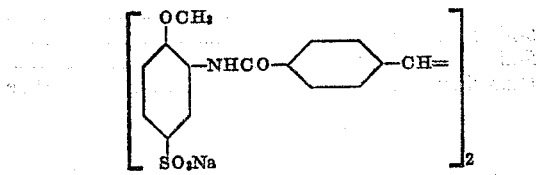

A mixture of 2.68 parts of stilbene-4,4'-dicarboxylic acid, 2.46 parts of thionyl chloride and 19.6 parts of dried pyridine is heated at 60° C. until conversion to the acid chloride is substantially complete. The mixture is then refluxed with 5.08 parts of 3-amino-4-methoxybenzenesulfonic acid until the condensation is substantially complete. The resulting mixture is drowned into about 250 parts of water containing 40 parts of sodium chloride and 4.5 parts of sodium carbonate. After the removal of the pyridine by steam distillation, the diamide is isolated by filtration. The product shows a blue fluorescence on cellulosic fibers under U. V. light.

Example 14

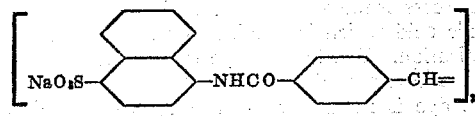

The procedure of the preceding example is followed, using 5.58 parts of naphthionic acid in place of the 3-amino-4-methoxybenzene sulfonic acid. A good yield of the fluorescent product is obtained.

Example 15

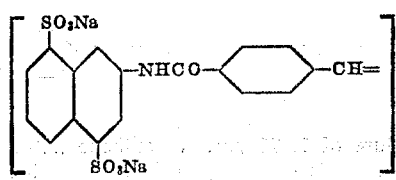

The diamide is prepared by the procedure of Example 13 except that 2.68 parts of stilbene-4,4'-dicarboxylic acid, 2.62 parts of thionyl chloride, 39.3 parts of pyridine and 7.58 parts of 2-aminonaphthalene-4,8-disulfonic acid are used. The product shows a greenish-blue fluorescence on cellulosic fibers under U. V. light.

We claim:
1. Compounds of the structure:

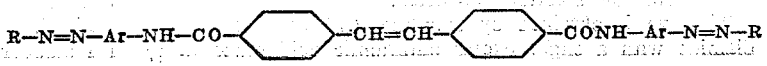

in which R and Ar are 6-membered carbocyclic aromatic radicals of not more than two rings.

2. Compounds of claim 1 in which R is further substituted by a mononuclear six membered carbocyclic aryl azo radical.

3. Compounds according to claim 1 in which R is a naphthalene radical.

4. Compounds according to claim 3 in which R is sulfonated, there being no more than two such sulfonic acid groups.

5. Compounds according to claim 1 in which Ar is a phenylene radical.

6. Compounds according to claim 1 in which Ar is a naphthylene radical.

7. A compound having the formula:

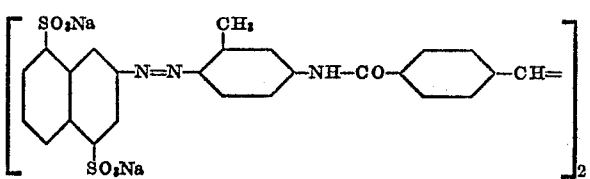

8. A compound having the formula:

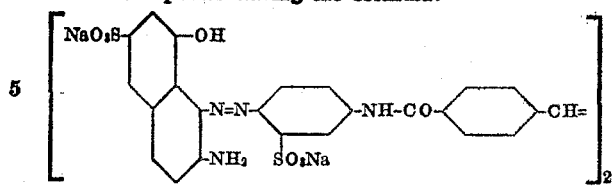

9. A compound having the formula:

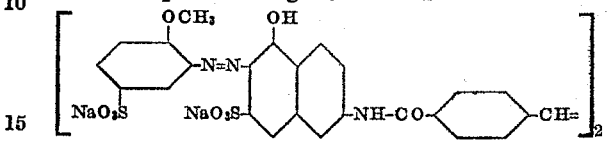

10. A compound having the formula:

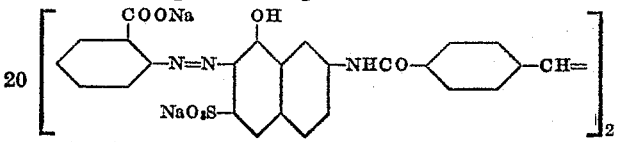

11. A compound having the formula:

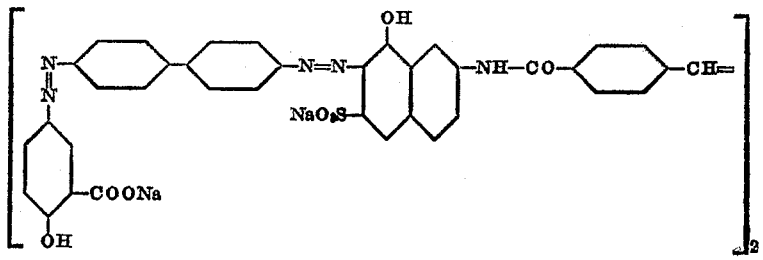

References Cited in the file of this patent
UNITED STATES PATENTS

| | | |
|---|---|---|
| 2,104,595 | Schirm | Jan. 4, 1938 |
| 2,569,409 | De Benneville et al. | Sept. 25, 1951 |
| 2,581,057 | Wirth et al. | Jan. 1, 1952 |
| 2,623,884 | Peter et al. | Dec. 30, 1952 |
| 2,646,338 | Keppeler et al. | July 21, 1953 |
| 2,673,198 | Grandjean et al. | Mar. 23, 1954 |